(12) United States Patent
Park et al.

(10) Patent No.: US 10,440,283 B2
(45) Date of Patent: Oct. 8, 2019

(54) ELECTRONIC DEVICE AND METHOD FOR CONTROLLING THE SAME

(71) Applicant: Samsung Electronics Co., Ltd., Suwon-si, Gyeonggi-do (KR)

(72) Inventors: Byeongchan Park, Suwon-si (KR); Kyungdong Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/650,774

(22) Filed: Jul. 14, 2017

(65) Prior Publication Data

US 2018/0020142 A1  Jan. 18, 2018

(30) Foreign Application Priority Data

Jul. 15, 2016 (KR) ........................ 10-2016-0089816

(51) Int. Cl.
*H04N 5/235* (2006.01)
*H04N 5/232* (2006.01)

(52) U.S. Cl.
CPC ....... *H04N 5/2351* (2013.01); *H04N 5/23212* (2013.01); *H04N 5/23216* (2013.01); *H04N 5/23219* (2013.01)

(58) Field of Classification Search
CPC .......................... H04N 5/2351; H04N 5/23212
See application file for complete search history.

(56) References Cited

U.S. PATENT DOCUMENTS

| 7,569,308 | B2 | 8/2009 | Wang et al. |
| 8,218,028 | B2* | 7/2012 | Izume ................. H04N 5/23212 |
| | | | 348/229.1 |
| 8,878,980 | B2 | 11/2014 | Ohbuchi et al. |
| 9,007,514 | B2 | 4/2015 | Nakamura |
| 9,071,760 | B2* | 6/2015 | Ueda .................. H04N 5/23293 |
| 9,172,863 | B2 | 10/2015 | Ohbuchi et al. |
| 2011/0205403 | A1 | 8/2011 | Ito |
| 2013/0016245 | A1 | 1/2013 | Yuba |

FOREIGN PATENT DOCUMENTS

| JP | 2002-196220 A | 7/2002 |
| JP | 2004-309653 A | 11/2004 |
| JP | 2006-162943 A | 6/2006 |
| JP | 2007-065048 A | 3/2007 |
| JP | 2007-108412 A | 4/2007 |
| JP | 2010-243899 A | 10/2010 |

(Continued)

*Primary Examiner* — Padma Haliyur

(57) ABSTRACT

The present disclosure relates to an electronic device. The electronic device may comprise an image sensor and a processor connected to the image sensor electrically. The processor can generate a first image based on an electric signal generated by the image sensor. A first contrast value for the first image is calculated. A brightness value of the brightest point in a first area centered at a first point included in the first image is stored as a brightness value of the first point. A second image is generated based on the stored brightness values a weighted value is determined for each point according to the brightness value of each point included in the second image. A second contrast value is calculated based on the determined weighted value of each point and the first contrast value.

16 Claims, 12 Drawing Sheets

(56) References Cited

FOREIGN PATENT DOCUMENTS

| | | |
|---|---|---|
| JP | 2011-150281 A | 8/2011 |
| JP | 2011-175119 A | 9/2011 |
| JP | 2012-137530 A | 7/2012 |
| JP | 2013-024886 A | 2/2013 |
| JP | 2013-097082 A | 5/2013 |
| JP | 2013-140297 A | 7/2013 |
| JP | 2013-148678 A | 8/2013 |
| JP | 2015-125196 A | 7/2015 |

* cited by examiner

ELECTRONIC DEVICE AND METHOD FOR CONTROLLING THE SAME

CROSS-REFERENCE TO RELATED APPLICATION(S) AND CLAIM OF PRIORITY

This application is related to and claims the benefit under 35 U.S.C. § 119(a) of a Korean patent application filed on Jul. 15, 2016, in the Korean Intellectual Property Office and assigned Serial No. 10-2016-0089816, the entire disclosure of which is hereby incorporated by reference.

TECHNICAL FIELD

The present disclosure relates to a function of selecting a correct focus point for an input image and, more particularly, to an electronic device and a method enabling a selection of a correct focus point in an image having a point light source where a light part is concentrated in a specific area.

BACKGROUND

In accordance with recent developments in the electronic communication industry, user equipment such as a mobile terminal, electronic scheduler, personal complex terminal, laptop computer, and wearable device have become necessities in modern society and important means for transferring rapidly changing information. Such user equipment includes a photographing function and an image editing function in a basic specification, and it is difficult to find user equipment that has no photographing function.

Various technologies are applied to user equipment produced recently so that a user can focus on a desired location quickly. In particular, user equipment using a contrast focusing method can provide the user with a correctly focused image by calculating a correct contrast value from an input image.

SUMMARY

In the contrast focusing method, there can be problems of generating an incorrect contrast value, if a bright point light source is included in a partial area of an input image.

To address the above-discussed deficiencies, it is a primary object to provide an electronic device and a method for decreasing a weighted value for a contrast value calculated incorrectly by a point light source included in a partial area of an input image.

An electronic device according to various embodiments of the present disclosure may comprise an image sensor and a processor connected to the image sensor electrically. The processor can generate a first image based on an electric signal generated by the image sensor, calculate a first contrast value for the first image, store a brightness value of the brightest point in a first area centered at a first point included in the first image as a brightness value of the first point, generate a second image based on the stored brightness values, determine a weighted value for each point according to the brightness value of each point included in the second image, and calculate a second contrast value by using the determined weighted value of each point and the first contrast value.

In the electronic device according to various embodiments of the present disclosure, the image sensor may comprise a plurality of pixels, and the processor can be configured to generate a first image based on an electric signal generated from pixels corresponding to a predetermined area of the plurality of pixels included in the image sensor.

In the electronic device according to various embodiments of the present disclosure, the processor may be configured to calculate the first contrast value by using a brightness value of each point corresponding to a predetermined area of pixels having a brightness value included in the first image.

In the electronic device according to various embodiments of the present disclosure, the electronic device may comprise a display for receiving a touch input, and the predetermined area may be one of a partial area of the first image corresponding to a touch position received by the display, a center area of the first image, or an area including a face detected from the first image.

In the electronic device according to various embodiments of the present disclosure, the processor may be configured to determine a high weighted value for brightness values of points less than a predetermined value and a low weighted value for brightness values of points greater than the predetermined value, based on the highest brightness value among the brightness values of each point included in the second image.

In the electronic device according to various embodiments of the present disclosure, the processor may be configured not to apply a weighted value to a point having the highest brightness value among the brightness values of each point included in the second image.

A method for controlling an electronic device having an image sensor according to various embodiments of the present disclosure may comprise generating a first image based on an electric signal generated by the image sensor, calculating a first contrast value for the first image, storing a brightness value of the brightest point in a first area centered at a first point included in the first image as a brightness value of the first point and generating a second image based on the stored brightness values, and determining a weighted value for each point according to the brightness value of each point included in the second image and calculating a second contrast value by using the determined weighted value of each point and the first contrast value.

In the method for controlling an electronic device having an image sensor, the image sensor may comprise a plurality of pixels, and generating a first image based on an electric signal generated by the image sensor may comprise generating a first image based on an electric signal generated from pixels corresponding to a predetermined area among pixels included in the image sensor.

In the method for controlling an electronic device having an image sensor, calculating a first contrast value for the first image may comprise generating the first contrast value by using brightness values of each point corresponding to a predetermined area among points having a brightness value included in the first image.

In the method for controlling an electronic device having an image sensor, the electronic device may comprise a display for receiving a touch input, and the predetermined area may be one of a partial area of the first image corresponding to a touch position received by the display, a center area of the first image, or an area including a face detected from the first image.

In the method for controlling an electronic device having an image sensor, determining a weighted value for each point according to the brightness value of each point included in the second image may comprise determining a high weighted value for brightness values of points less than a predetermined value and a low weighted value for brightness values of points greater than the predetermined value, based on the highest brightness value among the brightness values of each point included in the second image.

In the method for controlling an electronic device having an image sensor, determining a weighted value for each point according to the brightness value of each point included in the second image may comprise not applying a weighted value to a point having the highest brightness value among the brightness values of each point included in the second image.

A non-temporary recording medium for controlling an electronic device having an image sensor according to various embodiments of the present disclosure may include programs for executing a method of controlling the electronic device in order to generate a first image based on an electric signal generated by the image sensor, to calculate a first contrast value for the first image, to store a brightness value of the brightest point in a first area centered at a first point included in the first image as a brightness value of the first point and generate a second image based on the stored brightness values, and to determine a weighted value for each point according to the brightness value of each point included in the second image and calculate a second contrast value by using the determined weighted value of each point and the first contrast value.

An electronic device according to various embodiments of the present disclosure may comprise an image sensor including a plurality of pixel arrays and a processor connected to the image sensor electrically. The processor can generate a first image based on an electric signal generated by the image sensor, calculate a first contrast value for the first image, select at least one point included in the first image, select an area including points located in a predetermined distance from the center of the at least one point, store a brightness value of the brightest point in the area as a representative brightness value of the area by matching with the area, generate a second image based on the stored representative brightness values, determine a weighted value for each point according to the brightness value of each point included in the second image, and calculate a second contrast value by using the determined weighted value and the first contrast value.

An electronic device according to various embodiments of the present disclosure can calculate a first contrast value for a first image generated by an image sensor, store a brightness value of the brightest point in a first area centered at a first point included in the first image as a brightness value of the first point, generate a second image based on the stored brightness values, and detect a correct focus point by calculating a second contrast value with a weighted value according to brightness values of points included in a second image even though a point light source is included in an image.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
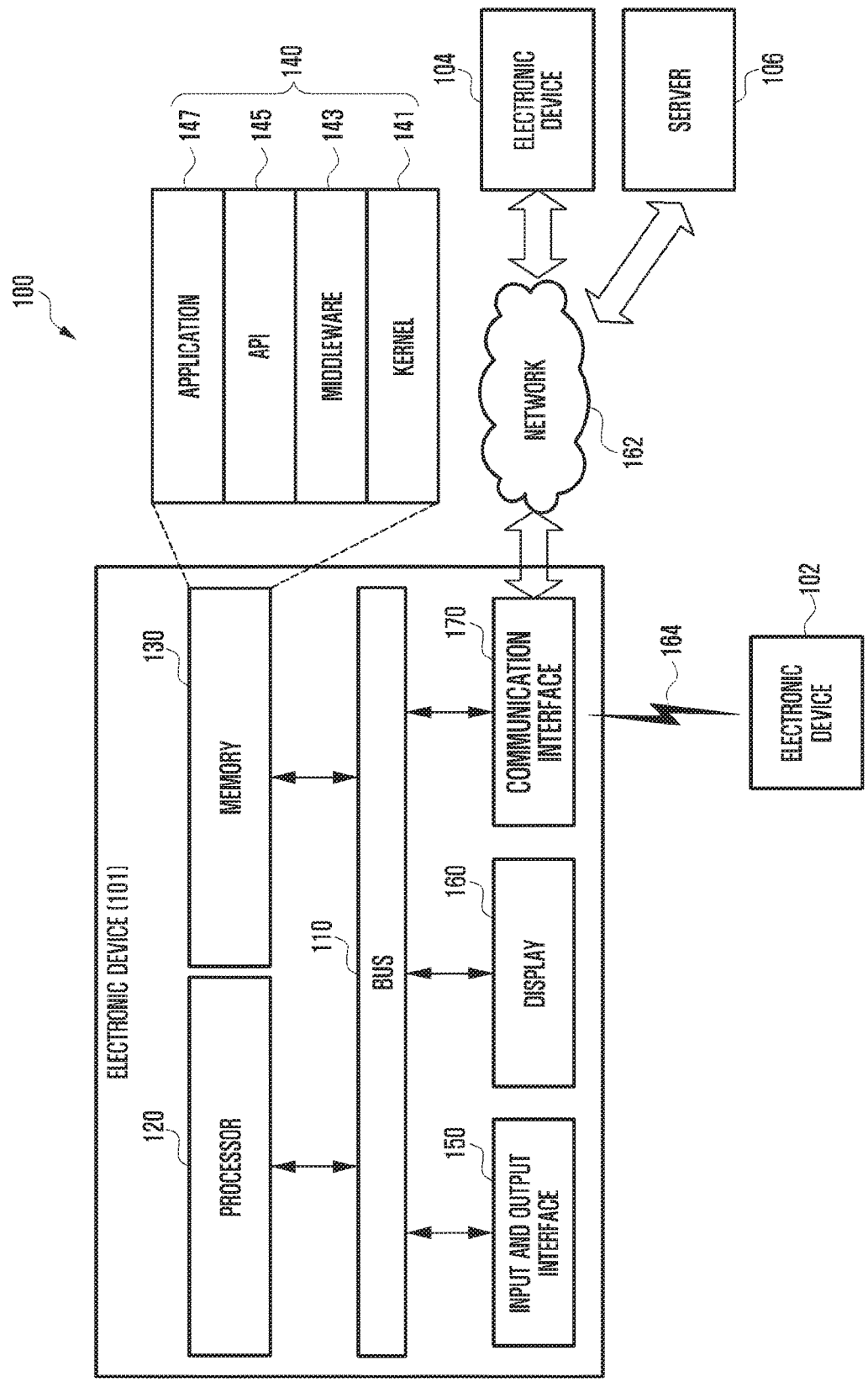
FIG. 1 illustrates a network environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" which may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component may be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure may be a device including a communication function. For example, the electronic device may be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HID) such as electronic glasses, electronic clothes, and electronic bracelet, an electronic necklace, an electronic appcessary, an electronic tattoo, and a smart watch.

According to some embodiments, the electronic device may be a smart home appliance having a communication function. The smart home appliance may include at least one of a Television (TV), a Digital Video Disk (DVD) player, an audio player, an air conditioner, a cleaner, an oven, a microwave oven, a washing machine, an air cleaner, a set-top box, a TV box (for example, Samsung HomeSync®, Apple TV®, or Google TV®), game consoles, an electronic dictionary, an electronic key, a camcorder, and an electronic frame.

According to some embodiments, the electronic device may include at least one of various types of medical devices (for example, Magnetic Resonance Angiography (MRA), Magnetic Resonance Imaging (MRI), Computed Tomography (CT), a scanner, an ultrasonic device and the like), a navigation device, a Global Navigation Satellite System (GNSS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device may include at least one of furniture or a part of a building/structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure may be one or a combination of the above described various devices. Further, the electronic device according to various embodiments of the present disclosure may be a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) which uses an electronic device.

According to one embodiment of the present disclosure, a screen of an electronic device may be split into at least two windows according to a predefined split manner and displayed through a display of an electronic device. The windows are defined as split windows. According to one embodiment, the split windows are defined as windows displayed on a display of an electronic display not to be superposed one on another.

According to one embodiment, a popup window is defined as a window displayed on a display of an electronic device to hide or to be superposed on a portion of a screen under execution.

According to one embodiment of the present disclosure, an electronic device using split window and a popup window is capable of displaying two or more application execution screens or function execution screens. Thus, the split windows and the popup window are defined as a multi-window.

Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates a network environment 100 including an electronic device 101 according to various embodiments of the present disclosure. Referring to FIG. 1, the electronic device 101 includes a bus 110, a processor 120, a memory 130, a input/output interface 150, a display 160 and a communication interface 170.

The bus 110 may be a circuit connecting the above described components and transmitting communication (for example, a control message) between the above described components. The processor 120 receives commands from other components (for example, the memory 130, the input/output interface 150, the display 160, the communication interface 170) through the bus 110, analyzes the received commands, and executes calculation or data processing according to the analyzed commands. The memory 130 stores commands or data received from the processor 120 or other components (for example, the input/output interface 150, the display 160, or the communication interface 170) or generated by the processor 120 or other components. The memory 130 may include programming modules 140, for example, a kernel 141, middleware 143, an Application Programming Interface (API) 145, and an application 147. Each of the aforementioned programming modules may be implemented by software, firmware, hardware, or a combination of two or more thereof.

The kernel 141 controls or manages system resources (for example, the bus 110, the processor 120, or the memory 130) used for executing an operation or function implemented by the remaining other programming modules, for example, the middleware 143, the API 145, or the application 147. Further, the kernel 141 provides an interface for accessing individual components of the electronic device 101 from the middleware 143, the API 145, or the application 147 to control or manage the components. The middleware 143 performs a relay function of allowing the API 145 or the application 147 to communicate with the kernel 141 to exchange data. Further, in operation requests received from the application 147, the middleware 143 performs a control for the operation requests (for example, scheduling or load balancing) by using a method of assigning a priority, by which system resources (for example, the bus 110, the processor 120, the memory 130 and the like) of the electronic device 100 can be used, to the application 134.

The API 145 is an interface by which the application 147 can control a function provided by the kernel 141 or the middleware 143 and includes, for example, at least one interface or function (for example, command) for a file control, a window control, image processing, or a character control. The input/output interface 150 can receive, for example, a command and/or data from a user, and transfer the received command and/or data to the processor 120 and/or the memory 130 through the bus 110. The display 160 can display an image, a video, and/or data to a user.

According to an embodiment, the display 160 may display a graphic user interface image for interaction between the user and the electronic device 100. According to various embodiments, the graphic user interface image may include interface information to activate a function for correcting color of the image to be projected onto the screen. The interface information may be in the form of, for example, a button, a menu, or an icon. The communication interface 170 connects communication between the electronic device 100 and the external device (for example, electronic device 102, 104 or server 106). For example, the communication interface 170 may access a network 162 through wireless or wired communication to communicate with the external device. The wireless communication includes at least one of, for example, WiFi, BlueTooth® (BT), Near Field Communication (NFC), a Global Navigation Satellite System (GNSS), and cellular communication (for example, LTE, LTE-A, CDMA, WCDMA, UMTS, WiBro or GSM). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment, the server 106 supports driving of the electronic device 100 by performing at least one operation (or function) implemented by the electronic device 101. For example, the server 106 may include a communication control server module that supports the communication interface 170 implemented in the electronic device 101. For example, the communication control server module may include at least one of the components of the communication interface 170 to perform (on behalf of) at least one operations performed by the communication interface 170.

Figure 2:
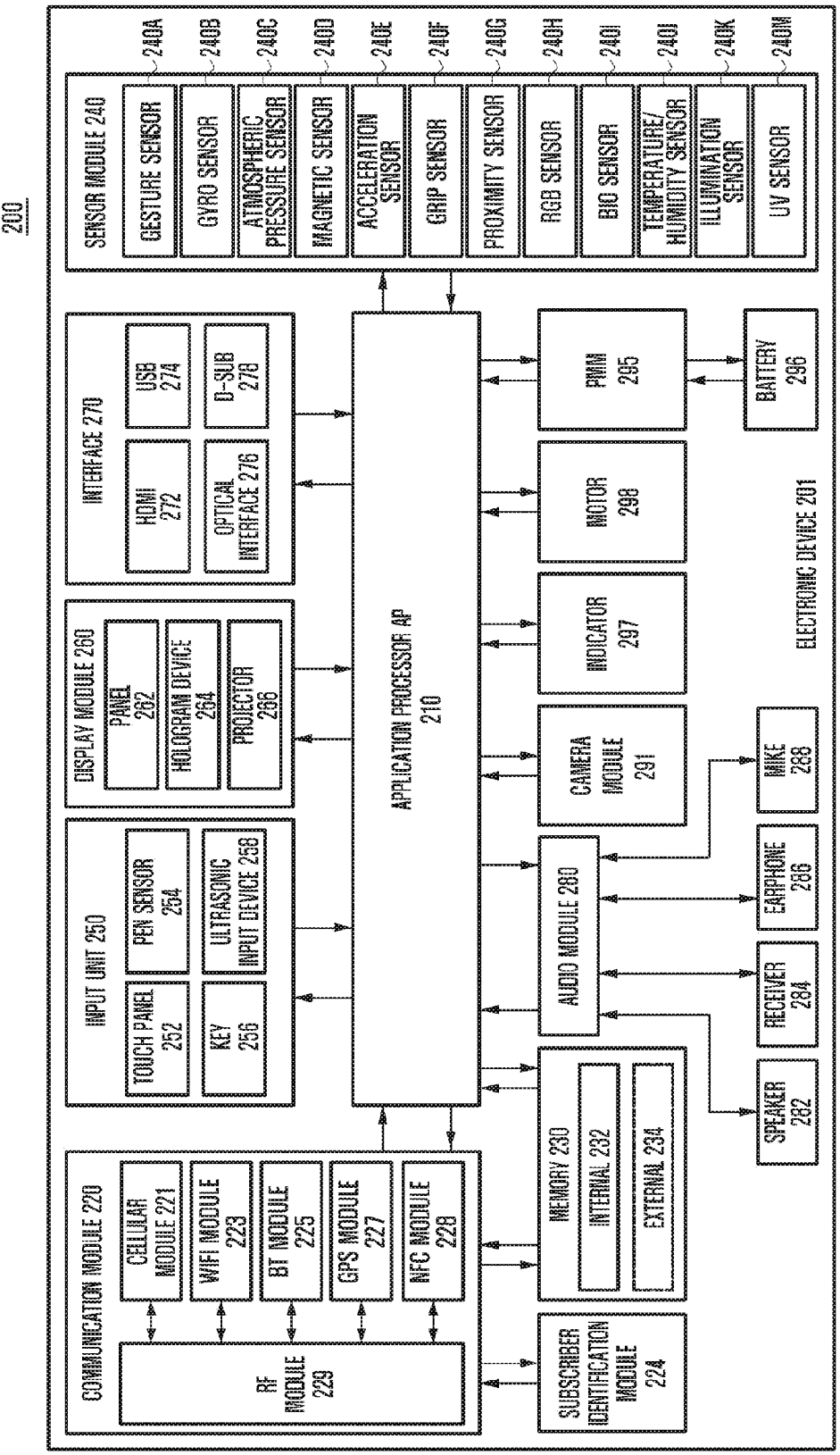
FIG. 2 illustrates a block diagram illustrating a configuration of an electronic device according to various embodiments of the present disclosure.

FIG. 2 illustrates a block diagram 200 of an electronic device 201 according to various embodiments of the present disclosure. The electronic device 201 may configure, for example, a whole or a part of the electronic device 100 illustrated in FIG. 1. Referring to FIG. 2, the electronic device 201 includes one or more Application Processors (APs) 210, a communication module 220, a Subscriber Identification Module (SIM) card 224, a memory 230, a sensor module 240, an input device 250, a display 260, an interface 270, an audio module 280, a camera module 291, a power managing module (PMM) 295, a battery 296, an indicator 297, and a motor 298.

The AP 210 operates an operating system (OS) or an application program so as to control a plurality of hardware or software component elements connected to the AP 210 and execute various data processing and calculations including multimedia data. The AP 210 may be implemented by, for example, a System on Chip (SoC). According to an embodiment, the application processor 210 may further include a Graphic Processing Unit (GPU).

The communication module 220 (for example, communication interface 170) transmits/receives data in communication between different electronic devices (for example, the electronic device 104 and the server 106) connected to the electronic device 201 (for example, electronic device 101) through a network. According to an embodiment, the communication module 220 includes a cellular module 221, a WiFi module 223, a BlueTooth® (BT) module 225, a Global Navigation Satellite System (GNSS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 may distinguish and authenticate electronic devices within a communication network by using a subscriber identification module (for example, the SIM card 224). According to an embodiment, the cellular module 221 performs at least some of the functions which can be provided by the AP 210. For example, the cellular module 221 may perform at least some of the multimedia control functions.

According to an embodiment, the cellular module 221 may include a Communication Processor (CP). Further, the cellular module 221 may be implemented by, for example, an SoC.

According to an embodiment, the AP 210 or the cellular module 221 (for example, communication processor) may load a command or data received from at least one of a non-volatile memory and other components connected to each of the AP 210 and the cellular module 221 to a volatile memory and process the loaded command or data. Further, the AP 210 or the cellular module 221 may store data received from at least one of other components or generated by at least one of other components in a non-volatile memory.

Each of the WiFi module 223, the BT module 225, the GNSS module 227, and the NFC module 228 may include, for example, a processor for processing data transmitted/received through the corresponding module. Although the cellular module 221, the WiFi module 223, the BT module 225, the GNSS module 227, and the NFC module 228 are illustrated as blocks separate from each other in FIG. 2, at least some (for example, two or more) of the cellular module 221, the WiFi module 223, the BT module 225, the GNSS module 227, and the NFC module 228 may be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GNSS module 227, and the NFC module 228 may be implemented by one SoC.

The RF module 229 transmits/receives data, for example, an RF signal. Although not illustrated, the RF module 229 may include, for example, a transceiver, a Power Amp Module (PAM), a frequency filter, a Low Noise Amplifier (LNA) or the like. Further, the RF module 229 may further include a component for transmitting/receiving electronic waves over a free air space in wireless communication, for example, a conductor, a conducting wire, or the like. Although the cellular module 221, the WiFi module 223, the BT module 225, the GNSS module 227, and the NFC module 228 share one RF module 229 in FIG. 2, at least one of the cellular module 221, the WiFi module 223, the BT module 225, the GNSS module 227, and the NFC module 228 may transmit/receive an RF signal through a separate RF module according to one embodiment.

The SIM card 224 is a card including a Subscriber Identification Module and may be inserted into a slot formed in a particular portion of the electronic device. The SIM card 224 includes unique identification information (for example, Integrated Circuit Card IDentifier (ICCID)) or subscriber information (for example, International Mobile Subscriber Identity (IMSI)).

The memory 230 (for example, memory 130) may include an internal memory 232 or an external memory 234. The internal memory 232 may include, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a RGB sensor 240H (for example, colors Red, Green, and Blue (RGB) sensor) 240H, a biometric sensor 240I, a temperature/humidity sensor 240J, an illumination (light) sensor 240K, and a Ultra Violet (UV) sensor 240M. Additionally or alternatively, the sensor module 240 may include, for example, a E-nose sensor, an electromyography (EMG) sensor, an electroencephalogram (EEG) sensor, an electrocardiogram (ECG) sensor, an InfraRed (IR) sensor, an iris sensor, a fingerprint sensor (not illustrated), and the like. The sensor module 240 may further include a control circuit for controlling one or more sensors included in the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 can recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which can detect an acoustic wave by a microphone (for example, microphone 288) of the electronic device 201 through an input means generating an ultrasonic signal to identify data and can perform wireless recognition. According to an embodiment, the electronic device 201 receives a user input from an external device (for example, computer or server) connected to the electronic device 201 by using the communication module 220.

The display 260 (for example, display 160) includes a panel 262, a hologram device 264, and a projector 266. The panel 262 may be, for example, a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, the microphone 288 or the like.

The camera module 291 is a device which can photograph a still image and a video. According to an embodiment, the camera module 291 may include one or more image sensors (for example, a front sensor or a back sensor), an Image Signal Processor (ISP) (not shown) or a flash (for example, an LED or xenon lamp).

The power managing module (PMM) 295 manages power of the electronic device 201. Although not illustrated, the power managing module 295 may include, for example, a Power Management Integrated Circuit (PMIC), a charger Integrated Circuit (IC), or a battery or fuel gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier or the like may be added.

The battery fuel gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery. The indicator 297 shows particular statuses of the electronic device 201 or a part (for example, AP 210) of the electronic device 201, for example, a booting status, a message status, a charging status and the like. The motor 298 converts an electrical signal to a mechanical vibration.

Although not illustrated, the electronic device 201 may include a processing unit (for example, GPU) for supporting a module TV. The processing unit for supporting the mobile TV may process, for example, media data according to a standard of Digital Multimedia Broadcasting (DMB), Digital Video Broadcasting (DVB), media flow or the like.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

Figure 3:
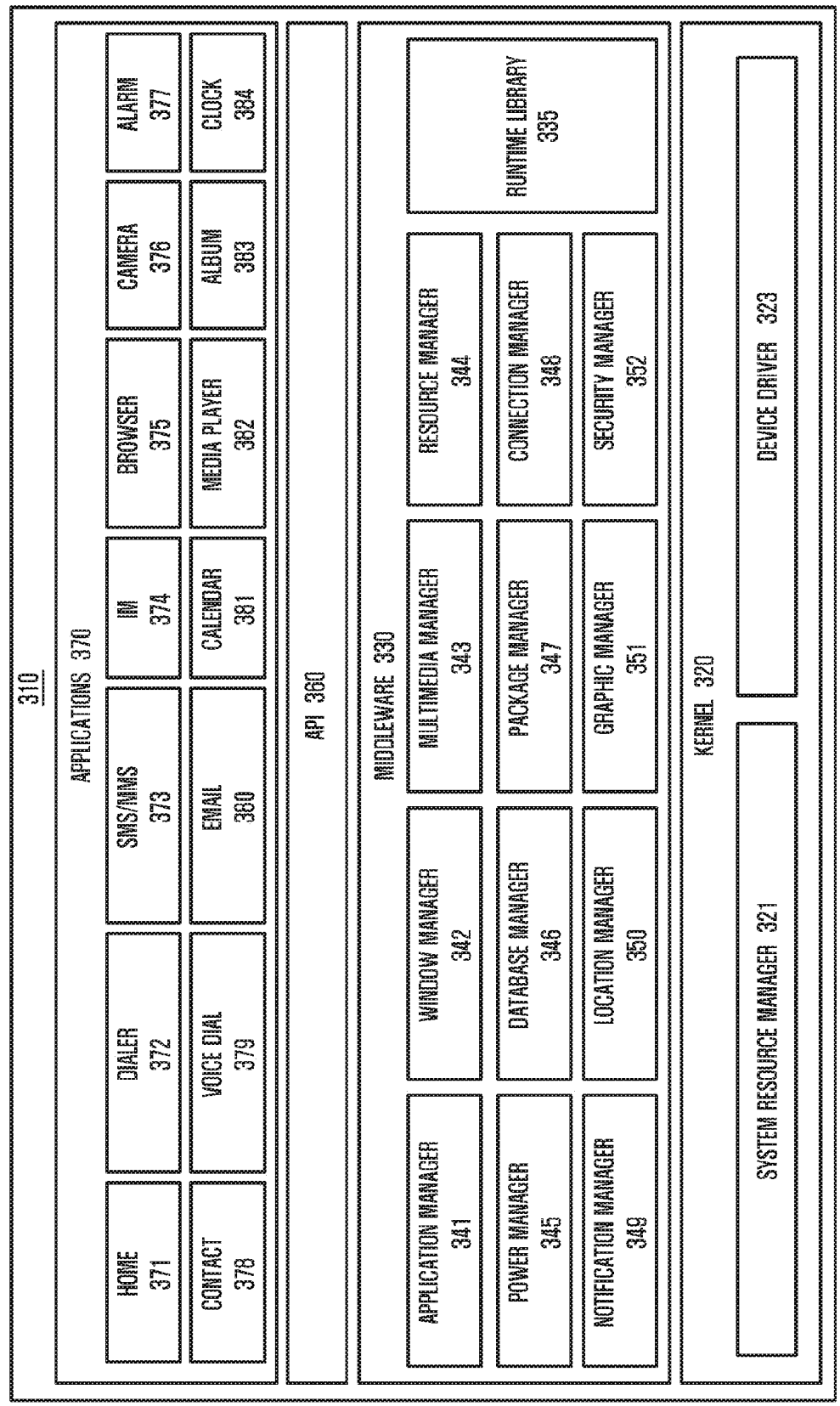
FIG. 3 illustrates a block diagram illustrating a configuration of a program module according to various embodiments of the present disclosure.

FIG. 3 illustrates a block diagram of a programming module 310 according to an embodiment. The programming module 310 (for example, programming module 140) may be included (stored) in the electronic device 101 (for example, memory 130) illustrated in FIG. 1. At least some of the programming module 310 may be formed of software, firmware, hardware, or a combination of at least two of software, firmware, and hardware. The programming module 310 may be executed in the hardware (for example, electronic device 201) to include an Operating System (OS) controlling resources related to the electronic device (for example, electronic device 100) or various applications (for example, applications 370) driving on the OS. For example, the OS may be Android, iOS, Windows, Symbian, Tizen, Bada or the like. Referring to FIG. 3, the programming module 310 includes a kernel 320, a middleware 330, an Application Programming Interface (API) 360, and applications 370.

The kernel 320 (for example, kernel 141) includes a system resource manager 321 and a device driver 323. The system resource manager 321 may include, for example, a process manager, a memory manager, and a file system manager. The system resource manager 321 performs a system resource control, allocation, and recall. The device driver 323 may include, for example, a display driver, a camera driver, a Bluetooth driver, a shared memory driver, a USB driver, a keypad driver, a WiFi driver, and an audio driver. Further, according to an embodiment, the device driver 323 may include an Inter-Process Communication (IPC) driver. The middleware 330 includes a plurality of modules prepared in advance to provide a function required in common by the applications 370. Further, the middleware 330 provides a function through the API 360 to allow the application 370 to efficiently use limited system resources within the electronic device. For example, as illustrated in FIG. 3, the middleware 330 (for example, middleware 143) includes at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352. The runtime library 335 includes, for example, a library module used by a complier to add a new function through a programming language while the application 370 is executed. According to an embodiment, the runtime library 335 executes input and output, management of a memory, a function associated with an arithmetic function and the like. The application manager 341 manages, for example, a life cycle of at least one of the applications 370. The window manager 342 manages GUI resources used on the screen. The multimedia manager 343 detects a format required for reproducing various media files and performs an encoding or a decoding of a media file by using a codec suitable for the corresponding format. The resource manager 344 manages resources such as a source code, a memory, or a storage space of at least one of the applications 370.

The power manager 345 operates together with a Basic Input/Output System (BIOS) to manage a battery or power and provides power information required for the operation. The database manager 346 manages generation, search, and change of a database to be used by at least one of the applications 370. The package manager 347 manages an installation or an update of an application distributed in a form of a package file.

The connection manager 348 manages, for example, a wireless connection such as WiFi or Bluetooth. The notification manager 349 displays or notifies a user of an event such as an arrival message, an appointment, a proximity alarm or the like, in a manner that does not disturb the user. The location manager 350 manages location information of the electronic device. The graphic manager 351 manages a graphic effect provided to the user or a user interface related to the graphic effect. The security manager 352 provides a general security function required for a system security or a user authentication. According to an embodiment, when the electronic device (for example, electronic device 101 or 201) has a call function, the middleware 330 may further include a telephony manager for managing a voice of the electronic device or a video call function. The middleware 330 may generate a new middleware module through a combination of various functions of the aforementioned internal component modules and use the generated new middleware module. The middleware 330 may provide a module specified for each type of operating system to provide a differentiated function. Further, the middleware 330 may dynamically delete some of the conventional components or add new components. Accordingly, some of the components described in the embodiment of the present disclosure may be omitted, replaced with other components having different names but performing similar functions, or other components may be further included.

The API 360 (for example, API 145) is a set of API programming functions, and may be provided with a different configuration according to an operating system. For example, in Android or iOS, a single API set may be provided for each platform. In Tizen, two or more API sets may be provided. The applications 370, which may include an application similar to the application 134, may include, for example, a preloaded application and/or a third party application. The applications 370 may include a home application 371 a dialer application 372, a Short Messaging Service (SMS)/Multimedia Messaging Service (MMS) application 373, an Instant Messaging (IM) application 374, a browser application 375, a camera application 376, an alarm application 377, a contact application 378, a voice dial application 379, an email application 380, a calendar application 381, a media player application 382, an album application 383, and a clock application 384. However, the present embodiment is not limited thereto, and the applications 370 may include any other similar and/or suitable application. At least a part of the programming module 310 can be implemented by commands stored in computer-readable storage media. When the commands are executed by at least one processor, e.g. the AP 210, at least one processor can perform functions corresponding to the commands. The computer-readable storage media may be, for example, the memory 230. At least a part of the programming module 310 can be implemented, e.g. executed, by, for example, the AP 210. At least a part of the programming module 310 may include, for example, a module, a program, a routine, a set of instructions and/or a process for performing at least one function.

The titles of the aforementioned elements of the programming module, e.g. the programming module 300, according to the present disclosure may vary depending on the type of the OS. The programming module according to the present disclosure may include at least one of the aforementioned elements and/or may further include other additional elements, and/or some of the aforementioned elements may be omitted. The operations performed by a programming module and/or other elements according to the present disclosure may be processed through a sequential, parallel, repetitive, and/or heuristic method, and some of the operations may be omitted and/or other operations may be added.

Figure 4:
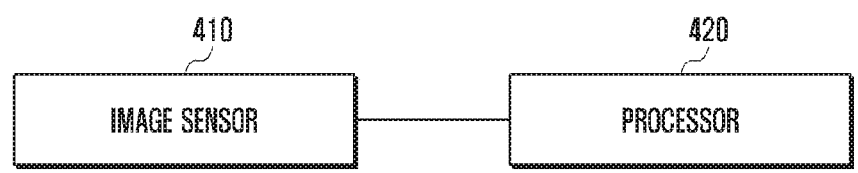
FIG. 4 illustrates a schematic block diagram illustrating a configuration of an electronic device according to an embodiment of the present disclosure.

FIG. 4 illustrates a schematic block diagram illustrating a configuration of an electronic device 101 according to an embodiment of the present disclosure. The electronic device 101 of FIG. 4 may be identical to the electronic device 101 of FIG. 1. The electronic device 101 of FIG. 4 may be identical to the electronic device 201 of FIG. 2. The electronic device 101 of FIG. 4 may include at least one part of the components in the electronic device of FIG. 1 and/or the whole components. The electronic device 101 of FIG. 4 may include at least one part of the components in the electronic device 201 of FIG. 2 and/or the whole components.

With reference to FIG. 4, the electronic device 101 may include an image sensor 410 and a processor 420. The electronic device 101 according to various embodiments may be configured with a more or less number of components than the components shown in FIG. 4. For example, the electronic device 101 may be configured by including an input module (e.g., touch panel, hard key, proximity sensor, and biosensor), power supply, or memory.

According to various embodiments, the image sensor 410 can be configured by being included in the camera module 291 of FIG. 2. Further, the electronic device 101 may include an image processing unit (not shown) for processing an image signal in the processor 420 or as a separate component. Hereinafter, the description will be made by assuming that an image is processed by the processor 420.

The image sensor 410 can receive an incident light through a lens (not shown). The image sensor 410 may include a pixel array arranged in a pattern with color pixel sensors (e.g., R GB and/or W (white) pixels). However, the image sensor 410 is not limited to this example and may include various forms.

According to various embodiments, each pixel included in the image sensor 410 can convert a light signal to an electric signal. Each pixel may include at least one micro lens (not shown), at least one color filter (not shown), and at least one photodiode.

The micro lens (not shown) can collect incident light from the outside. The color filter (not shown) may include a red filter, green filter, and blue filter, and at least one of a white filter, cyan filter, magenta filter, and yellow filter. The photodiode (not shown) can convert a light signal to an electric signal.

The processor 420 can control the above operations. Further, the processor 420, according to various embodiments, can control the image sensor 410 so that image signals are generated at a predetermined time or in a predetermined time interval. The processor 420 can store the generated image signals in sequence.

The processor 420 according to various embodiments can execute various post-processing operations by using the stored image signals. For example, the processor 420 can generate a first image by using the image signals generated through the image sensor 410. The processor 420 can calculate a first contrast value by using the generated first image.

The processor 420 can store a brightness value of the brightest point in a first area centered at a first point included in the first image as a brightness value of the first area. Subsequently, the processor 420 can generate a second image based on the stored brightness values.

The processor 420 can select one of the pixels included in the first image as a point, and select an area including pixels located in the center of a predetermined distance from the selected point. The processor 420 can calculate a brightness value of the brightest pixel in the area, and designate the calculated brightness value as a representative brightness value of the area. The designated representative brightness value can be stored in a memory (e.g., memory 230 of FIG. 2) under the control of the processor 420.

The processor 420 can generate a second image based on the brightness values calculated from at least one area.

The processor 420 according to various embodiments can determine a weighted value for each point according to the brightness values of each point included in the second image. The processor 420 can calculate a second contrast value by using the weighted value determined for each point and the first contrast value. The processor 420 can use the calculated second contrast value as data for an autofocus operation which will be described later.

According to various embodiments, the processor 420 can perform a process of removing a noise from a stored image. For example, the processor 420 can perform a signal processing for improving an image quality such as a gamma correction, color filter array interpolation, color matrix, color correction, and color enhancement.

Figure 5:
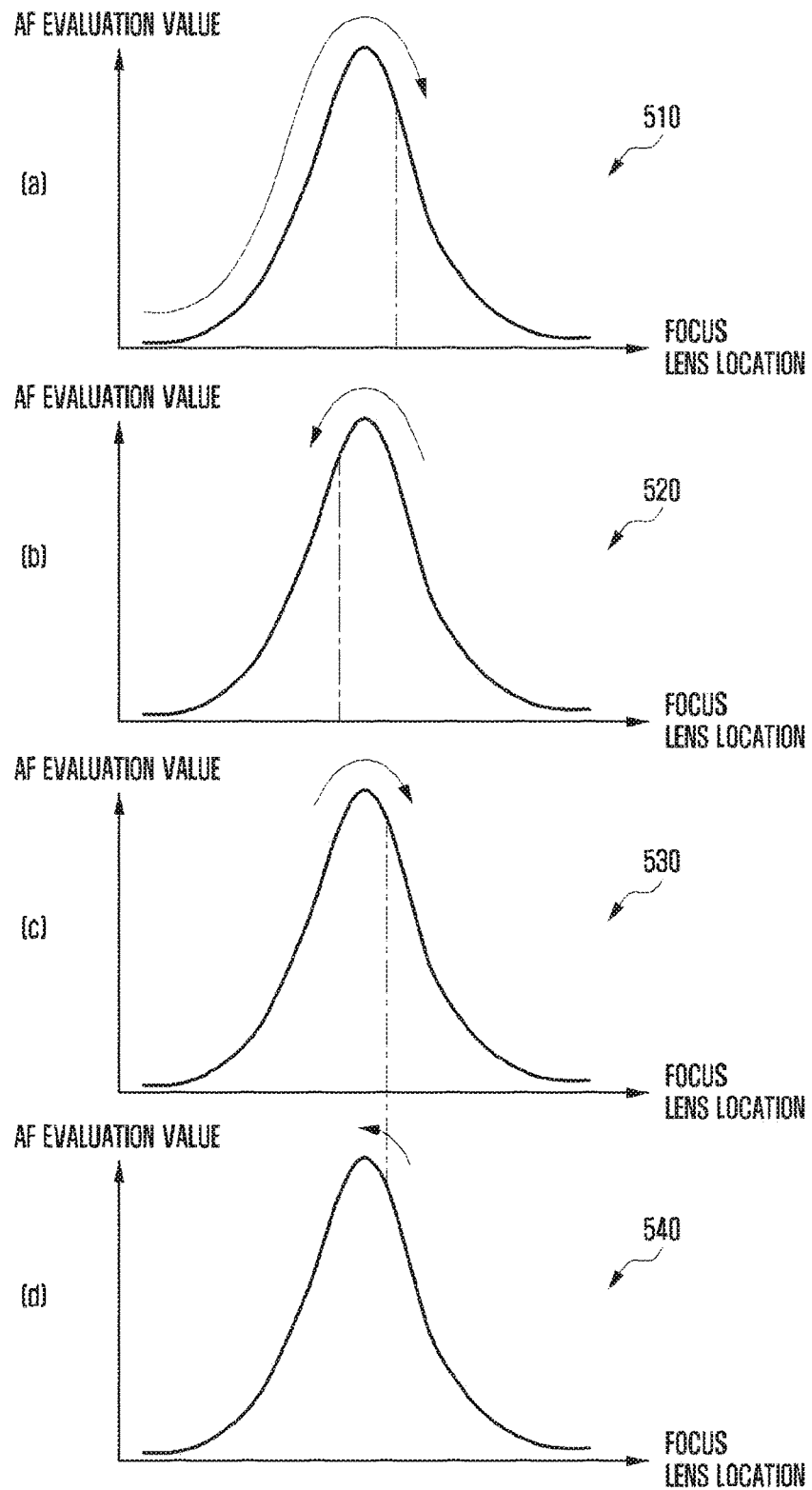
FIG. 5 illustrates AF (Auto Focus) operations in a contrast AF method.

FIG. 5 illustrates AF (Auto Focus) operations in a contrast AF method.

With reference to FIG. 5, the electronic device 101 can calculate repeatedly an AF evaluation value related to a contrast value from an electric signal that is generated by the image sensor 410 under the control of the processor 420. For example, the contrast value can be a difference between brightness values that are included in an electric signal and generated from pixels arranged in the image sensor 410. The electronic device 101 can calculate the difference between the brightness values that are included in the electric signal and generated by the pixels.

As described above, the image sensor 410 can include an R pixel, G pixel, B pixel, and W pixel. The pixels can be arranged in the image sensor 410 with a predetermined pattern. According to various embodiments, under the control of the processor 420, the electronic device 101 can calculate a contrast value by comparing brightness values generated from identical color pixels. Further, the electronic device 101 can calculate the contrast value by comparing an average brightness value extracted from pixels in a 2×2 form and another average brightness value extracted from adjacent pixels in a 2×2 form.

The electronic device 101 can use a contrast value as an AF evaluation value for an image by calculating and accumulating differences between brightness values included in electric signals that are generated by all the pixels arranged in the image sensor 410 under the control of the processor 420. However the function of the electronic device 101 is not limited to this example.

As another example, the electronic device 101 can calculate a contrast value by calculating differences between brightness values included in electric signals generated by pixels that are arranged in a partial area of the image sensor 410 under the control of the processor 420. Namely, under the control of the processor 420, the electronic device 101 can calculate a contrast value of an image by calculating and accumulating differences between brightness values included in electric signals generated by pixels that are included in an AF area as a partial area.

According to various embodiments, the electronic device 101 can include various AF areas. For example, the electronic device 101 can set the center area of an image input through the image sensor 410 as an AF area, or detect a face area from an input image and set the detected face area as an AF area. Further, the electronic device 101 can set a touch input or a point selected by a user in a display (not shown) displaying an input image as an AF area. The display (not shown) can be configured with a touch screen including a touch sensor. However the function of the electronic device 101 is not limited to this example, and the AF area can be set by various methods.

The electronic device 101 can perform an AF operation by detecting a location of a focus lens (not shown) having the maximum AF evaluation value.

The horizontal axis of FIG. 5 indicates a focus lens location, and the vertical axis of FIG. 5 indicates an AF evaluation value.

With reference to graph (a) of FIG. 5, the electronic device 101 can scan by driving a focus lens from one side to the other side at a high speed in order to detect a peak of an AF evaluation value (hereinafter, operation A 510). Here, the scan may mean calculating an AF evaluation value by driving the focus lens. The electronic device 101 detects an approximate peak location according to operation A 510.

With reference to graph (b) of FIG. 5, the electronic device 101 reverses the drive direction of the focus lens and can detect the peak again by driving the focus lens at a lower speed than the drive speed of graph (a) (hereinafter, operation B 520). The electronic device 101 can perform a precise AF detection according to operation B 520.

With reference to graph (c) of FIG. 5, the electronic device 101 reverses the drive direction of the focus lens again and can drive the focus lens towards a focus location according to the detected peak (hereinafter, operation C 530). Here, equipment driving a focus lens generally has a backlash, and a deviation can be generated in the focus lens location according to the drive direction. Accordingly, the deviation must be removed, and the electronic device 101 drives the focus lens by passing the focused location a little at operation C 530 in order to compensate for the deviation.

With reference to graph (d) of FIG. 5, the electronic device 101 drives the focus lens in the same direction as the drive direction of operation B 520 by reversing the drive direction of the focus lens again, and it stops the focus lens at the focused location (hereinafter, operation D 540).

According to various embodiments, the electronic device 101 can calculate an AF evaluation value by performing a scan operation also at operation C 530, and the calculated AF evaluation value can be used for detecting a movement of a subject.

The electronic device 101 can complete the contrast AF operation through the operations A to D.

Figure 6:
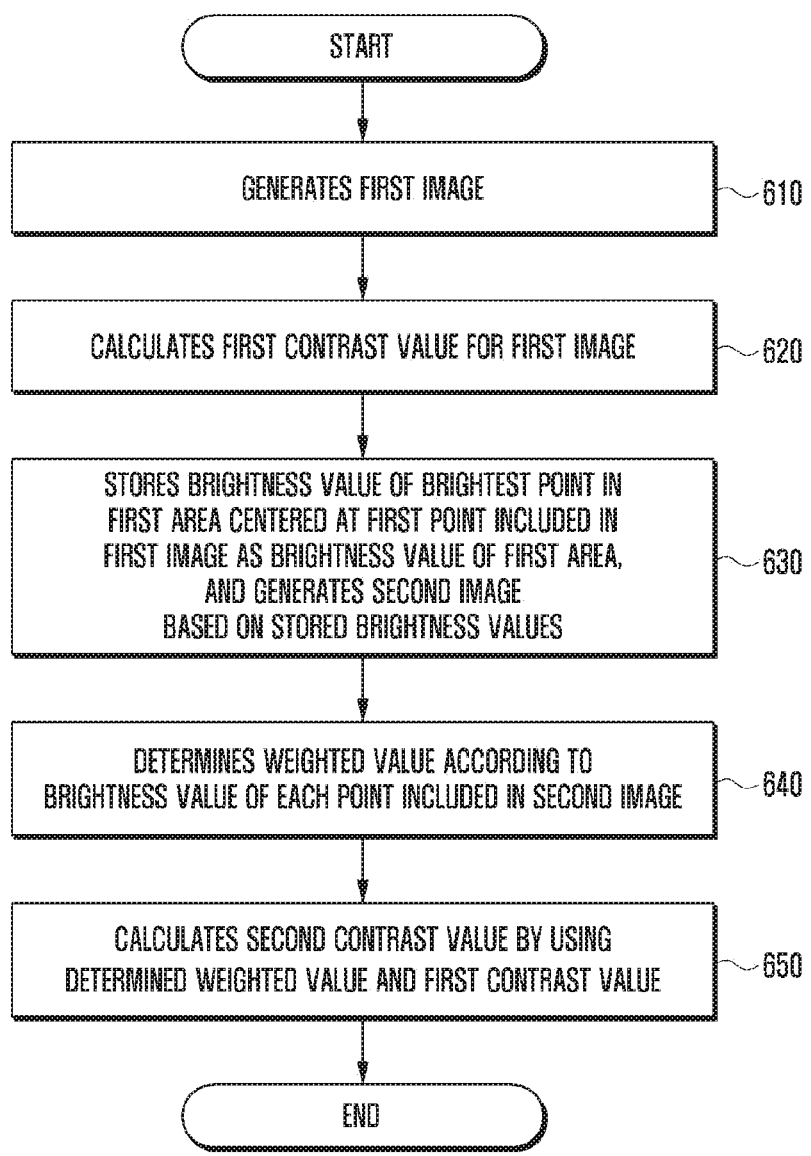
FIG. 6 is a flowchart illustrating a method for calculating a contrast value in an image generated by an electronic device according various embodiments of the present disclosure.

FIG. 6 is a flowchart illustrating a method for calculating a contrast value in an image generated by an electronic device according various embodiments of the present disclosure.

By using the method of calculating an AF evaluation value in FIG. 5, the electronic device 101 can provide a user with a correct screen by locating a focus lens (not shown) at a point (pixel) having a peak contrast value in an image input through the image sensor 410. FIG. 6 illustrates operations of calculating an AF evaluation value in case that a point light source having a brightness value higher than a predetermined brightness value is included in a partial area of an input image.

For example, the point light source image may mean that one or two bright light sources are included in a dark background of an image. In this case, objects in a dark part cannot be clearly expressed because a brightness value of a light source is greater than a brightness value of a dark part.

If a focus location is correctly set, the size of a point light source becomes smaller in an image including the point light source, and, if the focus location is incorrectly set, the size of a point light source becomes larger. Accordingly, the contrast value of an image having a correctly set focus location can be greater than the contrast value of an image having an incorrectly set focus location. Accordingly, the electronic device 101 must restrain the contrast value from being increased as the size of a point light source becomes greater in case that the focus location is set incorrectly.

With reference to operation 610, the electronic device 101 can generate a first image. According to various embodiments, the electronic device 101 can generate the first image by collecting lights reaching the image sensor 410 through a lens (not shown). The electronic device 101 can generate the first image by using electric signals output by all the pixels arranged in the image sensor 410, or generate the first image by using electric signals output by a partial amount of the pixels arranged in the image sensor 410.

According to various embodiments, the first image may not be an image for actually displaying in a screen of the electronic device 101. For example, the first image may be an assembly of electric signals that are output by pixels configuring the image sensor 410 and can generate a frame. Accordingly, the first image may include information included in electric signals output by each pixel (e.g., brightness information and color information). For example, if the first image is an image having brightness information, the first image may include a dark part and a bright part.

With reference to operation 620, under the control of the processor 420, the electronic device 101 can extract a first contrast value from the first image generated. Under the control of the processor 420, the electronic device 101 can calculate the contrast value of the first image by calculating brightness values included in the electric signals generated by all the pixels and by calculating and accumulating differences between brightness values of adjacent pixels.

For example, the electronic device 101 can calculate the contrast value by using a brightness difference between a dark part and a bright part included in the first image under the control of the processor 420. The electronic device 101, under the control of the processor 420, can calculate a high contrast value for an area (points) having a clear boundary between a dark part and a bright part in the first image. The electronic device 101, under the control of the processor 420, can calculate a low contrast value for an area or points having an obscured boundary between a dark part and a bright part in the first image, adjacent areas or points having a dark part, or adjacent areas or points having a bright part.

However the function of the electronic device is not limited to the above examples. The electronic device 101 can calculate the contrast value of the first image based on brightness values included in the electric signal output by pixels that are arranged in a partial area of the image sensor 410. The partial area of the image sensor 410 may be an AF area.

With reference to operation 630, under the control of the processor 420, the electronic device 101 can store a brightness value having the brightest point from a first area centered at a first point included in the first image as a brightness value of the first area, and generate a second image based on the stored brightness values.

With reference to operation 630, under the control of the processor 420, the electronic device 101 can select a point from pixels included in the first image, and select an area including pixels located in a predetermined distance from the selected point. The electronic device 101, under the control of the processor 420, can calculate a brightness value of the brightest pixel in the area, and store the calculated brightness value as a representative brightness value of the area. The representative brightness value can be stored in a memory (e.g., memory 230 of FIG. 2) under the control of the processor 420.

The electronic device 101, under the control of the processor 420, can generate a second image based on the brightness values calculated from at least one area.

According to various embodiments, under the control of the processor 420, the electronic device 101 can select a first area centered at the first point. According to various embodiments, the first point may be a unit point configuring the first image having a brightness value. The electronic device 101, under the control of the processor 420, can select a first area in a rectangular shape having a predetermined height and width, and centered at the first point. The electronic device 101, under the control of the processor 420, can select the first area so that a plurality of points having the same brightness value as that of the first point is included in the first area.

The electronic device 101, under the control of the processor 420, can find out a point having the highest brightness value from the first area. The electronic device 101, under the control of the processor 420, can store the highest brightness value by matching with the first area. As described above, the electronic device 101, under the control of the processor 420, can select each area including each pixel configuring the first image and store the highest brightness values of each area by matching with the corresponding area.

The electronic device 101, under the control of the processor 420, can generate a second image by accumulating the area. Namely, the electronic device 101 can generate a second image by changing brightness values. Accordingly, the electronic device 101, under the control of the processor 420, can generate a second image having an increased area than the first image.

With reference to operation 640, the electronic device 101, under the control of the processor 420, can determine a weighted value for the second image according to brightness values of each point. For example, the electronic device 101 can decrease the weighted value for a point having a high brightness value and increase the weighted value for a point having a low brightness value. However the weighted value is not limited to this example and may have various forms.

With reference to operation 650, the electronic device 101, under the control of the processor 420, can calculate a second contrast value by using the determined weighted value and the first contrast value. For example, the electronic device 101 can calculate the second contrast value by multiplying the weighted value and the first contrast value together.

According to various embodiments, the electronic device 101, under the control of the processor 420, can use an AF evaluation value by adding up second contrast values only for an AF area after processing the whole area of an image input through operations 610 to 650. However the function of the electronic device 101 is not limited to this example. For example, the electronic device 101, under the control of the processor 420, can perform the above operations only for the AF area.

Through the above process, the electronic device 101, under the control of the processor 420, can perform a correct AF operation by eliminating an increased contrast value if the focus is incorrectly set because of a point light source having a value greater than a predetermined value and included in an input image.

Figure 7:
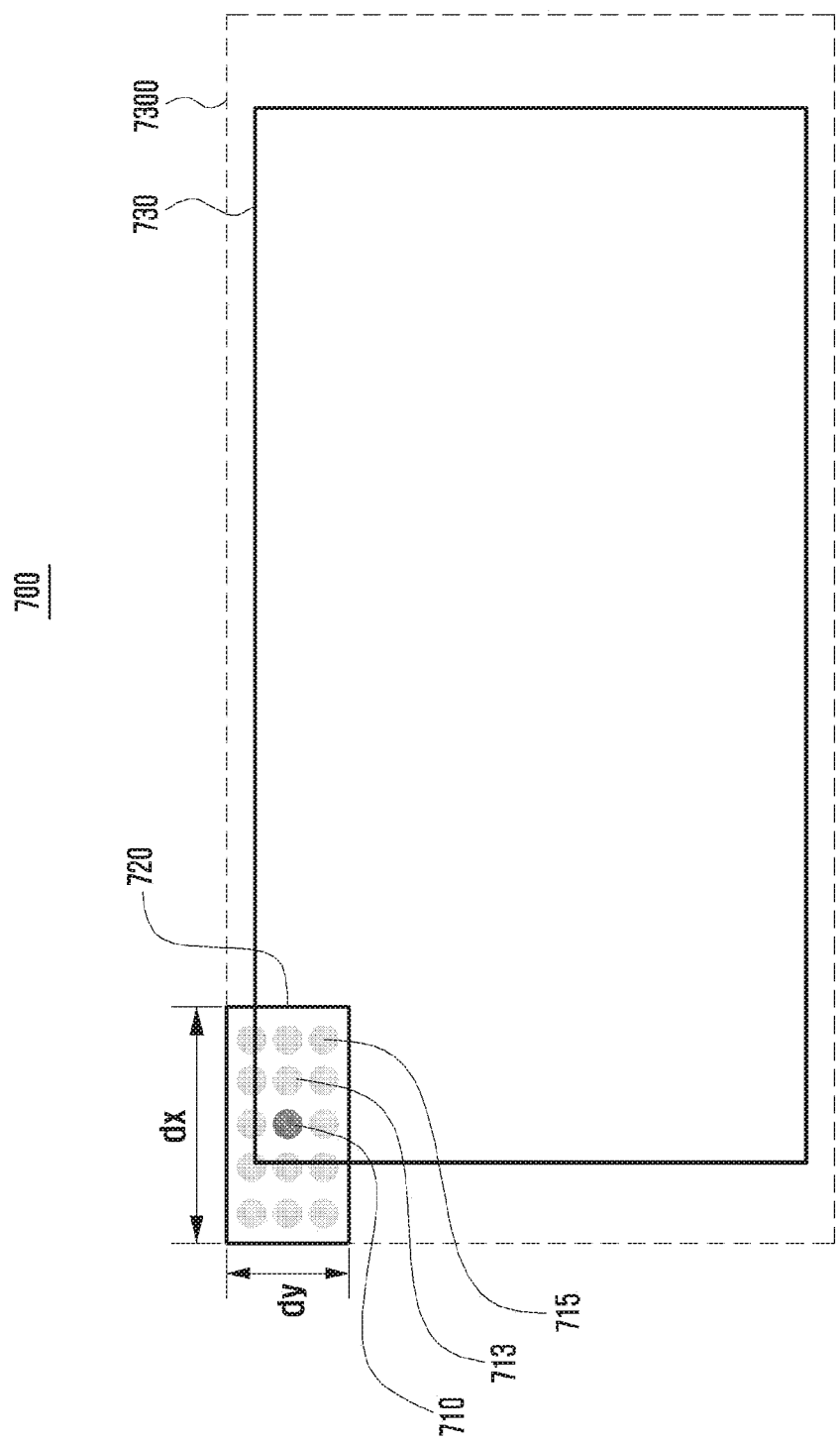
FIG. 7 illustrates a method of adjusting a brightness value for a first area centered at a first point in an electronic device according to various embodiments of the present disclosure.

FIG. 7 illustrates a method of adjusting a brightness value for a first area centered at a first point in an electronic device 101 according to various embodiments of the present disclosure.

With reference to FIG. 7, under the control of the processor 420, the electronic device 101 can generate a first image 700 by using an electric signal input through the image sensor 410 and a partial area of the first image 700 may be an area of a point light source 730 having a brightness value higher than a predetermined value.

According to various embodiments, under the control of the processor 420, the electronic device 101 can select a first area 720 including points (pixels) located within a predetermined distance from a first point 710 included in the first image 700. The first point 710 may be a point having an independent brightness value. The first point 710 may not mean a point included in the point light source 730. The first point 710 may be any point located in the first image 700.

According to various embodiments, under the control of the processor 420, the electronic device 101 can select a first area 720 having a width dx and a height dy by centering at the first point 710. Under the control of the processor 420, the electronic device 101 can set the first area 720 so that a plurality of points having individual brightness values is included in the first area 720. The number of plurality of points included in the first area 720 may vary from several numbers to several thousand numbers.

The electronic device 101 can find a point having the highest brightness value from a plurality of points in the first area 720. For example, the electronic device 101 can identify that a point 715 included in the first area 720 has a higher brightness value than the remaining points. The electronic device 101 can store the brightness value of a point 715 in a memory (e.g., memory 230 of FIG. 2) by matching as a brightness value of the first area 720. Under the control of the processor 420, the electronic device 101 can store the brightness value of a point 715 in a memory (e.g., memory 230 of FIG. 2) by matching as a representative brightness value of the first area 720.

Under the control of the processor 420, the electronic device 101 can perform the same procedure by changing the first point 710 after storing the brightness value of the first point 710. For example, the electronic device 101 can select a point adjacent to the first point 710 as a new first point 713. The electronic device 101 can find out a point having the highest brightness value from a first area by resetting the first area based on the first point 713, and store the corresponding brightness value in a memory (e.g., memory 230 of FIG. 2) by matching as a brightness value of the first area. Under the control of the processor 420, the electronic device 101 can store the brightness value of a point 715 in a memory (e.g., memory 230 of FIG. 2) by matching as a representative brightness value of the first area 720.

According to various embodiments, the electronic device 101 can perform the above process for the whole area of the first image 700. As the result, the electronic device 101 can generate a second image by using the changed brightness values. Subsequently, the electronic device 101 can generate a second image having a point light source 7300 enlarged from the first image 700.

Figure 8:
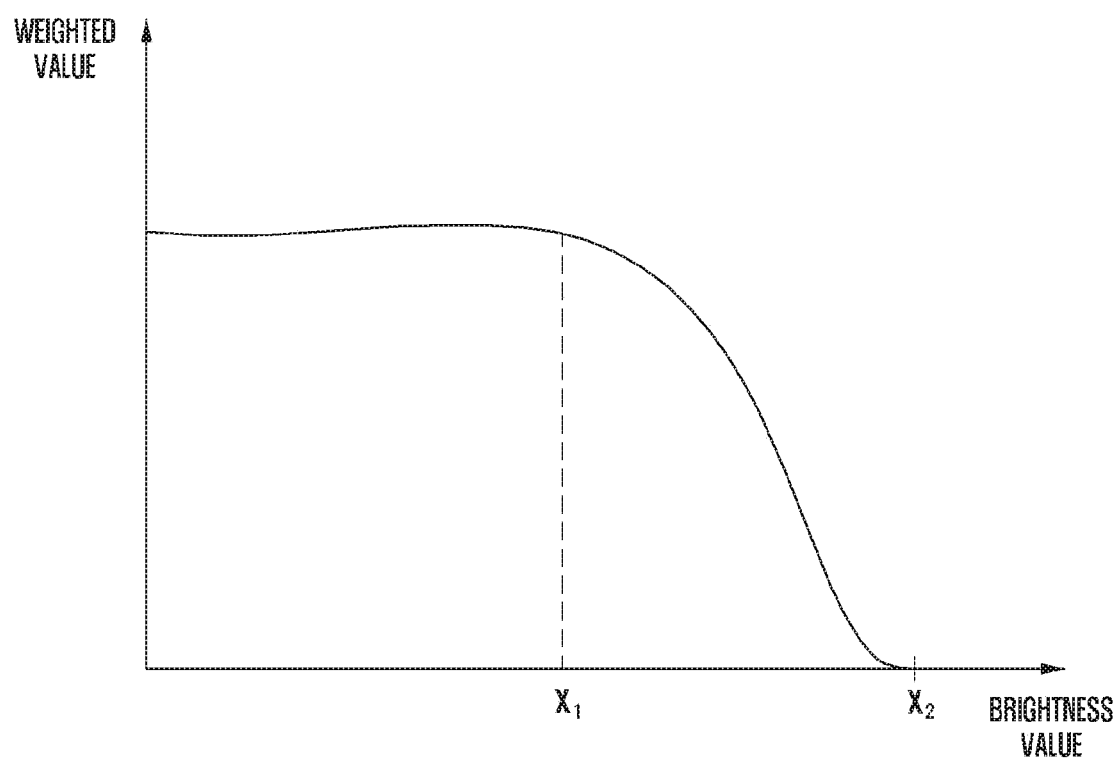
FIG. 8 illustrates a graph of weighted values for brightness values in an electronic device according to various embodiments of the present disclosure.

FIG. 8 illustrates a graph of weighted values for brightness values in an electronic device 101 according to various embodiments of the present disclosure.

With reference to FIG. 8, if the brightness value becomes higher than a predetermined value, the electronic device 101 can determine a weighted value for each point included in the second image by using a graph for decreasing the weighted value of the corresponding brightness value. The electronic device 101 can apply a high weighted value to points having a brightness value up to X1 and a low weighted value to points having a brightness value exceeding X1. Further, the electronic device 101 can apply the weighted value near by 0 to points having the highest brightness value X2.

For example, if it is assumed that the electronic device can distinguish the brightness value from 0 to 5000, the electronic device 101 can determine a high weighted value for points having a brightness value of 3500. Further, the electronic device 101 can decrease the weighted value gradually for points having a brightness value exceeding 3500 according to the graph. The electronic device 101 can generate a second contrast value for the first image by calculating the determined weighted value with the first contrast value of the first image.

Figure 9:
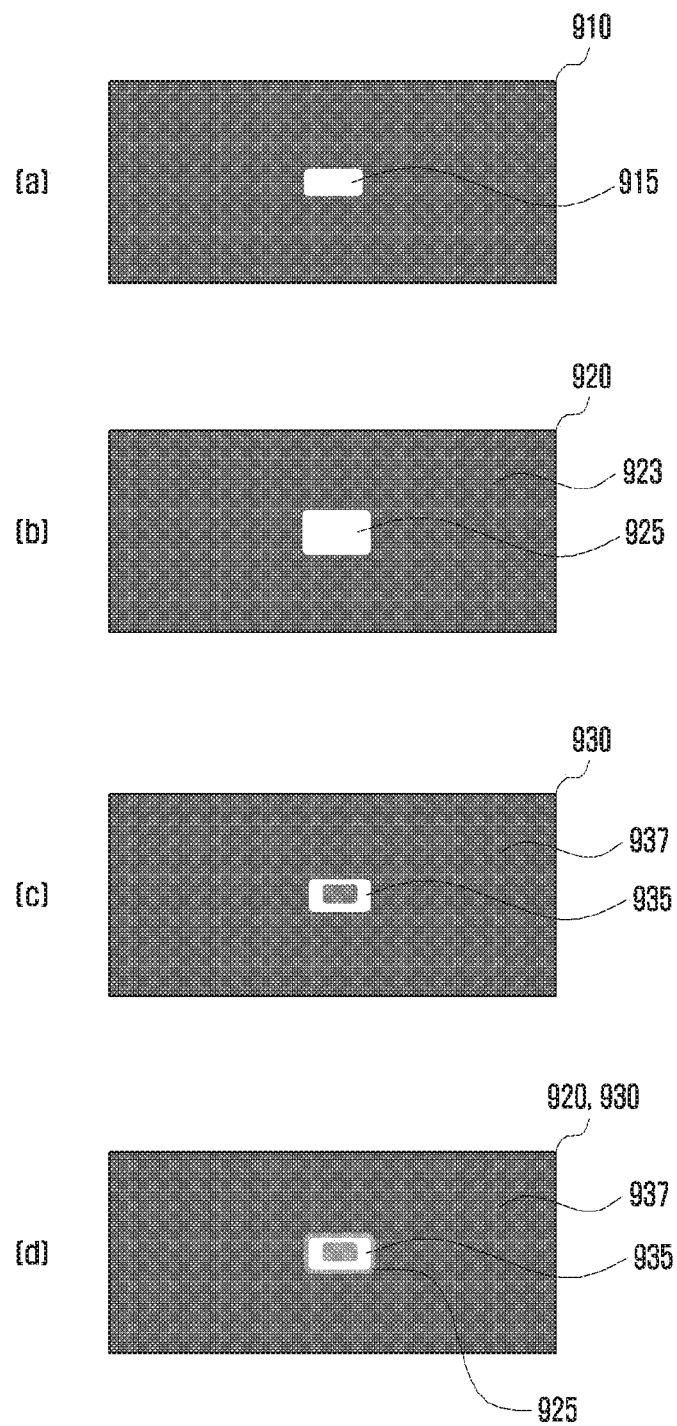
FIG. 9 illustrates a procedure of obtaining a contrast value for a first image in an electronic device according to various embodiments of the present disclosure.

FIG. 9 illustrates a procedure of obtaining a contrast value for a first image in an electronic device 101 according to various embodiments of the present disclosure.

With reference to FIG. 9 (*a*), the electronic device 101 can generate a first image 910 by using an electric signal input through the image sensor 410. A partial area of the first image 910 may be an area of a point light source 915 having a brightness value higher than a predetermined value.

According to various embodiments, in order to calculate a contrast value, the first image 910 may be an image expressing a brightness value generated by using brightness information included in an electric signal output by the image sensor 410.

For example, in an image (e.g., first image 910) including a point light source 915, the size of the point light source 915 may become smaller if a focus location is set correctly, and the size may become larger if the focus is set incorrectly. Accordingly, a contrast value of an image focused correctly may become greater than a contrast value of an image focused incorrectly.

Accordingly, in FIG. 9 (*a*), if a contrast value is calculated according to a movement of a focus lens, the electronic device 101 can calculate a higher contrast value for a correct focus than an incorrect focus.

With reference to FIG. 9 (*b*), the electronic device 101 can adjust a brightness value of a first area centered at a first point included in the first image 910.

According to various embodiments, the electronic device 101 can select a first area centered at a first point included in the first image 910. The first point may be a point having an independent brightness value. The first point may not mean a point included in the point light source 915. The first point may include any point located in the first image 910.

According to various embodiments, the electronic device 101 can select a first area having a predetermined range by centering at the first point 710. The electronic device 101 can store a brightness value of the brightest point separately from a plurality of points in the first area by matching the brightest point with a brightness value of the first area.

The electronic device 101 can perform the above procedure for the whole area of the first image 910. As the result, the electronic device 101 can generate a second image 920 by using changed brightness values. The electronic device 101 can generate the second image 920 having a point light source 925 expanded from the first image 910.

The electronic device 101 can match each point expressing a brightness value included in the second image 920 with the weighted value described in FIG. 8. For example, the electronic device 101 can match a bright area 925 with a low weighted value and a dark area 923 with a high weighted value.

With reference to FIG. 9 (*c*), the electronic device 101 can calculate a first contrast value from the first image 910. The first image 910 and the second image 920 may be images for expressing a brightness value, and the image 930 of FIG. 9 (*c*) may be an image for expressing a contrast value. In the images expressing brightness values, a white part has a high brightness value and a black part has a low brightness value. In the image 930 expressing a contrast value, a white part is an area having a high contrast value and a black part is an area having a low contrast value.

According to various embodiments, the electronic device 101 can calculate a first contrast value from the first image 910. For example, areas including only the dark part or the bright part in the first image 910 may have a low contrast value. On the contrary, a boundary area between a dark part and a bright part in first image 910 may have a high contrast value.

After calculating the first contrast value, the electronic device 101, under the control of the processor 420, can express an area 935 having a high contrast value and a darker area 937 having a low contrast value.

With reference to FIG. 9 (*d*), under the control of the processor 420, the electronic device 101 can calculate a second contrast value by calculating a weighted value matched with each point of the second image and the first contrast value 930 of the first image 910.

For example, the electronic device 101 can overlap the image 930 expressing a first contrast value and the second image 920. If the images 920 and 930 are overlapped, a bright area 935 having a high contrast value is matched with a dark area 937 having a low weighted value, and a dark area having a low contrast value is matched with an area 923 having a high weighted value.

Namely, the electronic device 101 can calculate, from the first contrast value, a second contrast value by decreasing the weighted value for area 935 having a high contrast value and increasing the weighted value for area 937 having a low contrast value. By using the calculated second contrast value, the electronic device 101 can restrain a phenomenon that a contrast value of the first image 910 increases because of the point light source 915.

Figure 10:
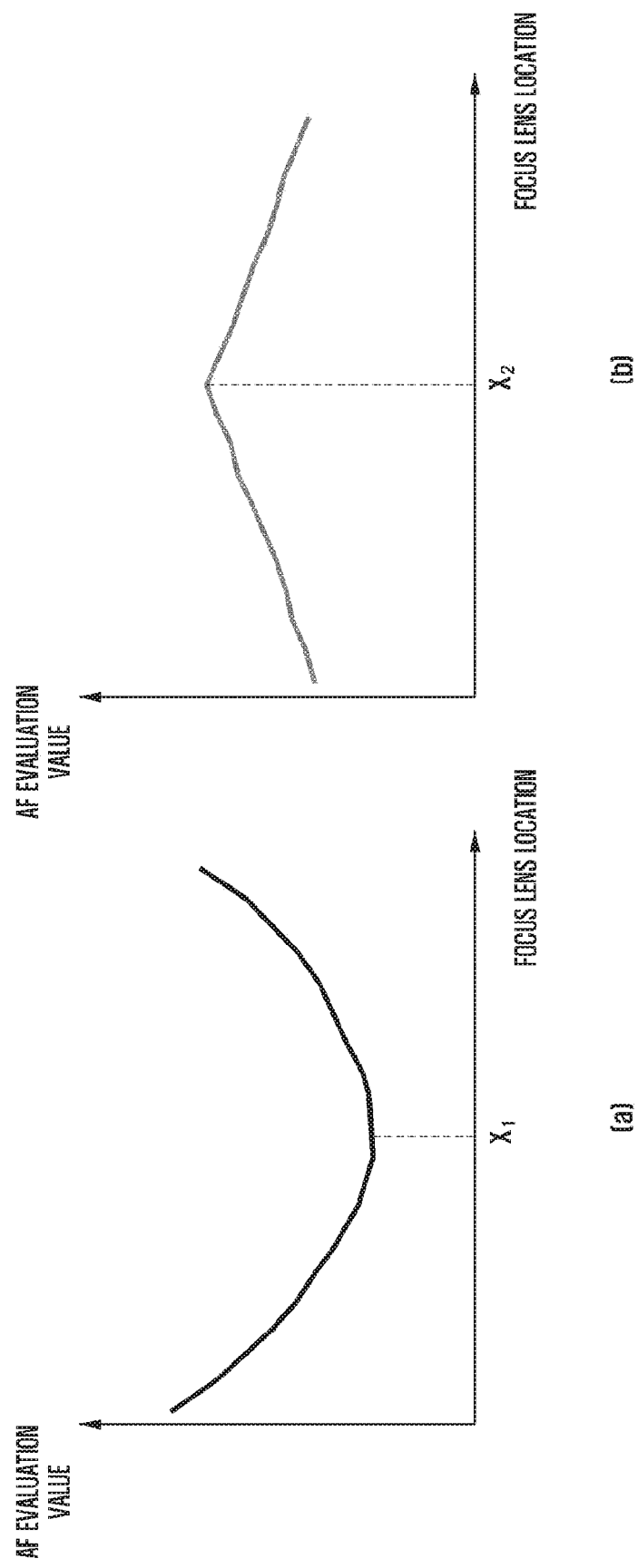
FIG. 10 illustrates a comparison between an AF evaluation value based on a first contrast value and an AF evaluation value based on a second contrast value in an electronic device according to various embodiments of the present disclosure.

FIG. 10 illustrates a comparison between an AF evaluation value based on a first contrast value and an AF evaluation value based on a second contrast value in an electronic device 101 according to various embodiments of the present disclosure.

With reference to FIG. 10, the electronic device 101 can calculate an AF evaluation value by moving a focus lens in a state of receiving an image including a point light source from the image sensor 410. For example, the electronic device 101 can calculate contrast values by using differences between brightness values included in images continuously being input through the image sensor 410, and calculate an AF evaluation value of an image by adding up the calculated contrast values. Subsequently, the electronic device 101 can generate a graph as shown in FIG. 10 by calculating AF evaluation values while moving the focus lens. An X-axis of the graph indicates a focus lens location and a Y-axis of the graph indicates an AF evaluation value.

With reference to FIG. 10 (*a*), the electronic device 101 can calculate an AF evaluation value based on the first contrast value. As described above, in case that an image includes a point light source image, the first contrast value becomes low if a focus is set correctly and high if the focus is set incorrectly. Accordingly, if the first contrast values calculated by moving the focus lens are listed, the electronic device 101 can have the lowest AF evaluation value at the focus location X1 where the focus is correctly set.

In this case, the electronic device 101 can change the focus lens location continuously because a correctly focused image cannot be displayed.

With reference to FIG. 10 (*b*), the electronic device 101 can calculate an AF evaluation value based on the second contrast value. As described above, the electronic device 101 can calculate a second contrast value by decreasing a weighted value of a bright part in the first image and increasing the weighted value of a dark part in the first image in order to restrain a phenomenon that a contrast value increases. Accordingly, if the second contrast values calculated by moving the focus lens are listed, the electronic device 101 can determine the highest AF evaluation value at a correctly focused location X2.

Figure 11:
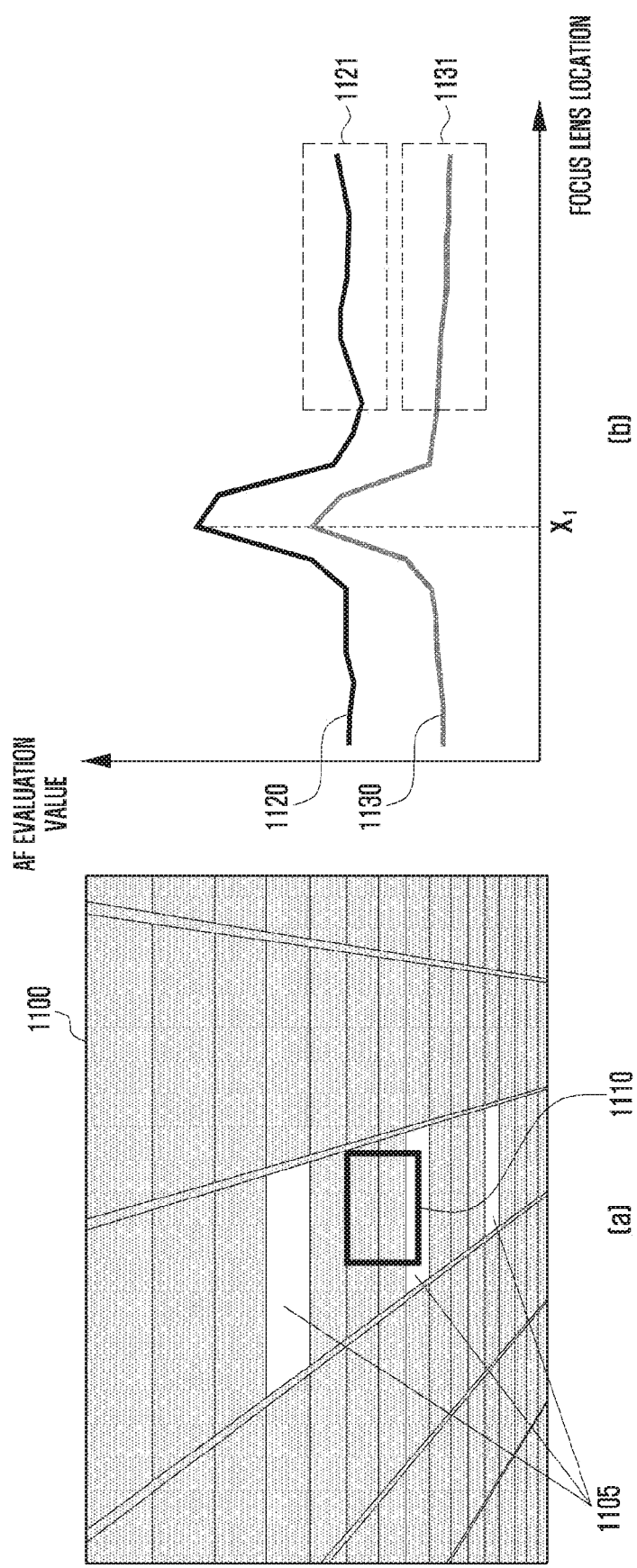
FIG. 11 illustrates an example depicting the difference between AF evaluation values based on the first contrast value and the second contrast value in an electronic device according to various embodiments of the present disclosure, when a light source is included in an image.

FIG. 11 illustrates an example of difference between AF evaluation values based on the first contrast value and the second contrast value in an electronic device 101 according to various embodiments of the present disclosure, in case that a light source is included in an obtained image.

With reference to FIG. 11 (*a*), the electronic device 101 can receive an image 1100 including a fluorescent light. The electronic device 101 can set an AF area 1110 both to an area including the fluorescent light 1105 and another area not including the fluorescent light 1105.

With reference to FIG. 11 (*b*), the electronic device 101 can calculate an AF evaluation value for the image 1100 including the fluorescent light 1105. FIG. 11 (*b*) illustrates an AF evaluation value graph 1120 generated on the basis of the first contrast value and an AF evaluation value graph 1130 generated on the basis of the second contrast value by the electronic device 101.

The AF area 1110 shown in FIG. 11 (*a*) includes a small part of an area including the fluorescent light 1105 and the remaining part not including the fluorescent light 1105, and thereby the focus lens locations having the highest AF evaluation value in the AF area can be identical. For example, both the AF evaluation value graph 1120 generated on the basis of the first contrast value and the AF evaluation value graph 1130 generated on the basis of the second contrast value display their highest AF evaluation values at point X1.

However, differences can be generated in a first section 1121 of the AF evaluation value graph 1120 calculated on the basis of the first contrast value and in a first section 1131 of the AF evaluation value graph 1130 calculated on the basis of the second contrast value. For example, the first sections 1121 and 1131 may be sections displaced from a location where the focus lens is set correctly.

In more detail, with reference to the first section 1121 of the AF evaluation value graph 1120 calculated on the basis of the first contrast value, the AF evaluation value increases as the focus lens location is displaced from the focused location. Accordingly, an error can be generated in identifying a movement direction of the focus lens while the electronic device 101 performs the AF operation shown in FIG. 5.

However, with reference to the first section 1131 of the AF evaluation value graph 1130 calculated on the basis of the second contrast value, the AF evaluation value decreases as the focus lens location is displaced from the focused location. Accordingly, the electronic device 101 can identify a movement direction of the focus lens correctly while performing the AF operation shown in FIG. 5.

Figure 12:
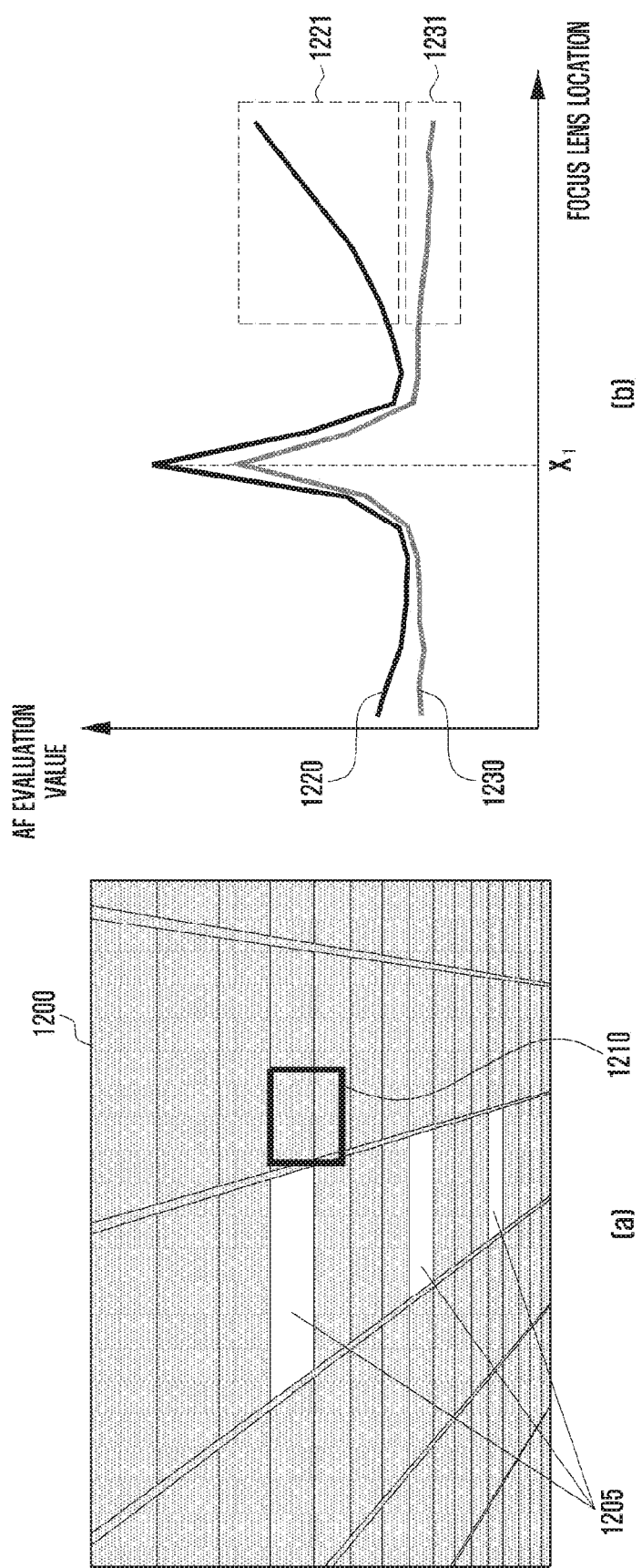
FIG. 12 illustrates another example depicting the difference between AF evaluation values based on the first contrast value and the second contrast value in an electronic device according to various embodiments of the present disclosure, when a light source is included in an image.

FIG. 12 illustrates another example of difference between AF evaluation values based on the first contrast value and the second contrast value in an electronic device 101 according to various embodiments of the present disclosure, in case that a light source is included in an obtained image.

With reference to FIG. 12 (*a*), the electronic device 101 can receive an image 1200 including a fluorescent light. The electronic device 101 can set an AF area 1210 to an area not including the fluorescent light 1205.

With reference to FIG. 12 (*b*), the electronic device 101 can calculate an AF evaluation value for the image 1200 including the fluorescent light 1205. FIG. 12 (*b*) illustrates an AF evaluation value graph 1220 generated on the basis of the first contrast value and an AF evaluation value graph 1230 generated on the basis of the second contrast value by the electronic device 101.

The AF area 1210 shown in FIG. 12 (*a*) is located adjacent to an area of the fluorescent light 1205, but it does not include an area of the fluorescent light 1205, and thereby the focus lens locations having the highest AF evaluation value in an AF area can be identical. For example, both the AF evaluation value graph 1220 generated on the basis of the first contrast value and the AF evaluation value graph 1230 generated on the basis of the second contrast value show the highest AF evaluation value at point X1.

However, a difference of AF evaluation value can be generated in a first section 1221 of the AF evaluation value graph 1220 calculated on the basis of the first contrast value and in a first section 1231 of the AF evaluation value graph 1230 calculated on the basis of the second contrast value. For example, the first sections 1221 and 1231 may be sections displaced from the location where the focus lens is set correctly.

In more detail, with reference to the first section 1221 of the AF evaluation value graph 1220 calculated on the basis of the first contrast value, the AF evaluation value increases rapidly as the focus lens location is displaced from the focused location. Namely, light can enter an AF area 1221 according to light scattering from a light source of an adjacent fluorescent light 1205, if the focus lens is displaced from the focused location. The electronic device 101 can calculate an AF evaluation value increasing rapidly. Accordingly, an error can be generated in identifying a movement direction of the focus lens while the electronic device 101 performs the AF operation shown in FIG. 5.

However, with reference to the first section 1231 of the AF evaluation value graph 1230 calculated on the basis of the second contrast value, the AF evaluation value decreases as the focus lens is displaced from the focused location. Accordingly, the electronic device 101 can identify the movement direction of the focus lens correctly while performing the AF operation shown in FIG. 5.

The term "module" used in the present disclosure includes units configured with hardware, software, or firmware, and can be used interchangeably with terms of logic, logical block, component, or circuit. The "module" can be an integrally configured component, a minimum unit performing at least one function, or a part of them.

The "module" can be configured mechanically or electronically, and it may include an ASIC (Application-Specific Integrated Circuit) chip, FPGAs (Field-Programmable Gate Arrays), or a programmable logic device performing a specific operation that is already well known or will be developed in future.

At least one part of the device (e.g., modules or their function) or the method (e.g., operations) according to various embodiments of the present disclosure can be configured with commands of a program module stored in a computer readable recording media (e.g., memory 130). If the commands are executed by a processor (e.g., processor 120), the processor can perform a function corresponding to the commands. The computer readable recording media may include a hard disk, floppy disk, magnetic media (e.g., magnetic tape), optical recording media (e.g., CD-ROM and DVD), magneto optical media (e.g., floptical disk), and internal memory. The command may include a code generated by a compiler or a code executable by an interpreter.

The module or program module according to various embodiments of the present disclosure may include at least one of the aforementioned components, a part of the components may be omitted, or other components may be further included. Operations according to various embodiments of the present disclosure can be performed in sequence or parallel, repeatedly, or heuristically by using a module, program module, or other components. At least one part of the operations can be performed in a difference sequence or omitted, and other operations can be further included.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   an image sensor; and
   a processor connected to the image sensor electrically,
   wherein the processor is configured to:
   generate a first image based on an electric signal generated by the image sensor,
   calculate a first contrast value for the first image,
   store a plurality of brightness values, wherein each brightness value is a value of a brightest point within a first area centered at a first point in the first image, as a brightness value of the first point,
   generate a second image based on the stored plurality of brightness values,
   determine a weighted value for each point based on the brightness value of each point included in the second image,
   calculate a second contrast value based on the determined weighted value of each point and the first contrast value,
   determine a high weighted value for brightness values of points less than a predetermined value and a low weighted value for brightness values of points greater than the predetermined value, based on the value of the brightest point among the brightness values of each point included in the second image, and perform an auto focus (AF) operation based on the calculated second contrast value as data for an auto focus evaluation value, wherein the weighted value is calculated using the high weighted value.

2. The electronic device of claim 1, wherein:

the image sensor comprises a plurality of pixels, and the processor is further configured to generate the first image based on an electric signal generated from pixels corresponding to a predetermined area of the plurality of pixels included in the image sensor.

3. The electronic device of claim 1, wherein the processor is further configured to calculate the first contrast value by using the brightness value of each point corresponding to a predetermined area of pixels having a brightness value included in the first image.

4. The electronic device of claim 3, wherein:

the electronic device comprises a display configured to receive a touch input, and the predetermined area is one of a partial area of the first image corresponding to a touch position received by the display, a center area of the first image, or an area including a face detected from the first image.

5. The electronic device of claim 1, wherein the processor is further configured not to apply a weighted value to a point having the value of the brightest point among the brightness values of each point included in the second image.

6. A method for controlling an electronic device having an image sensor, the method comprising:

generating a first image based on an electric signal generated by the image sensor;

calculating a first contrast value for the first image;

storing a plurality of brightness values, wherein each brightness value is a value of a brightest point within a first area centered at a first point in the first image as a brightness value of the first point;

generating a second image based on the stored plurality of brightness values;

determining a weighted value for each point based on a brightness value of each point included in the second image;

calculating a second contrast value based on the determined weighted value of each point and the first contrast value;

determining a high weighted value for brightness values of points less than a predetermined value and a low weighted value for brightness values of points greater than the predetermined value, based on the value of the brightest point among the brightness values of each point included in the second image; and performing an auto focus (AF) operation based on the calculated second contrast value as data for an auto focus evaluation value, wherein the weighted value is calculated using the high weighted value.

7. The method of claim 6, wherein:

the image sensor comprises a plurality of pixels, and generating the first image based on the electric signal generated by the image sensor comprises generating the first image based on an electric signal generated from pixels corresponding to a predetermined area among pixels included in the image sensor.

8. The method of claim 6, wherein calculating the first contrast value for the first image comprises generating the first contrast value by using the brightness values of each point corresponding to a predetermined area among points having a brightness value included in the first image.

9. The method of claim 8, further comprising receiving a touch input on a display of the electronic device, wherein the predetermined area is one of a partial area of the first image corresponding to a touch position received by the display, a center area of the first image, or an area including a face detected from the first image.

10. The method of claim 6, wherein determining the weighted value for each point based on the brightness value of each point included in the second image comprises:

not applying a weighted value to a point having the value of the brightest point among the brightness values of each point included in the second image.

11. A non-transitory storage medium comprising a program for controlling an electronic device having an image sensor, the program comprising program code that, when executed by at least one processor of the electronic device, causes the at least one processor to:

generate a first image based on an electric signal generated by the image sensor;

calculate a first contrast value for the first image;

store a plurality of brightness values, wherein each brightness value is a value of a brightest point within a first area centered at a first point in the first image, as a brightness value of the first point;

generating a second image based on the stored plurality of brightness values;

determine a weighted value for each point according to a brightness value of each point included in the second image and calculating a second contrast value by using the determined weighted value of each point and the first contrast value;

determine a high weighted value for brightness values of points less than a predetermined value and a low weighted value for brightness values of points greater than the predetermined value, based on the value of the brightest point among the brightness values of each point included in the second image; and perform an auto focus (AF) operation based on the calculated second contrast value as data for an auto focus evaluation value, wherein the weighted value is calculated using the high weighted value.

12. The non-transitory storage medium of claim 11, wherein:

the image sensor comprises a plurality of pixels, and the program code, when executed at the at least one processor, further causes at least one processor to generate the first image based on an electric signal generated from pixels corresponding to a predetermined area of the plurality of pixels included in the image sensor.

13. The non-transitory storage medium of claim 11, wherein the program code when executed at the at least one processor, further causes at least one processor to calculate the first contrast value by using the brightness value of each point corresponding to a predetermined area of pixels having a brightness value included in the first image.

14. An electronic device comprising:

an image sensor including a plurality of pixel arrays; and a processor connected to the image sensor electrically, wherein the processor is configured to:

generate a first image based on an electric signal generated by the image sensor, calculate a first contrast value for the first image, select at least one point included in the first image, select an area including points located in a predetermined distance from a center of the at least one point, store a brightness value of a brightest point in the area as a representative brightness value of the area by matching with the area, generate a second image based on the stored representative brightness value, determine a weighted value for each point of the at least one point based on a brightness value of each point included in the second image, calculate a second contrast value by using the determined weighted value and the first contrast value, determine a high weighted value for brightness values of points less than a predetermined value and a low weighted value for brightness values of points greater than the predetermined value, based on the brightest point among the brightness value of each point included in the second image, and perform an auto focus (AF) operation based on the calculated second contrast value as data for an auto focus evaluation value, wherein the weighted value is calculated using the high weighted value.

15. The electronic device of claim 14, wherein:

the image sensor comprises a plurality of pixels, and the processor is further configured to generate the first image based on an electric signal generated from pixels corresponding to a predetermined area of the plurality of pixels included in the image sensor.

16. The electronic device of claim 14, wherein the processor is further configured to calculate the first contrast value by using the brightness value of each point corresponding to a predetermined area of pixels having a brightness value included in the first image.

* * * * *